United States Patent
Hsiao et al.

(10) Patent No.: US 10,970,822 B2
(45) Date of Patent: Apr. 6, 2021

(54) IMAGE PROCESSING METHOD AND ELECTRONIC DEVICE THEREOF

(71) Applicant: REALTEK SEMICONDUCTOR CORP., Hsinchu (TW)

(72) Inventors: Ching-Ju Hsiao, Hsinchu (TW); Wen-Tsung Huang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 29 days.

(21) Appl. No.: 16/676,858

(22) Filed: Nov. 7, 2019

(65) Prior Publication Data
US 2020/0286210 A1 Sep. 10, 2020

(30) Foreign Application Priority Data
Mar. 8, 2019 (TW) ................................. 108107926

(51) Int. Cl.
*G06T 5/00* (2006.01)
*G06T 11/00* (2006.01)
*G06T 1/20* (2006.01)

(52) U.S. Cl.
CPC ............ *G06T 5/002* (2013.01); *G06T 11/001* (2013.01); *G06T 1/20* (2013.01)

(58) Field of Classification Search
CPC ...................................................... G06T 5/002
USPC ....................................................... 382/162
See application file for complete search history.

(56) References Cited

U.S. PATENT DOCUMENTS

| | | | |
|---|---|---|---|
| 4,680,624 A | 7/1987 | Murakami | |
| 7,583,407 B2 * | 9/2009 | Imai ......................... | H04N 1/54 345/591 |
| 7,646,393 B2 * | 1/2010 | Choe ..................... | H04N 1/6075 345/604 |
| 9,569,821 B2 * | 2/2017 | Takahashi ............... | G06T 5/002 |
| 2002/0176105 A1 * | 11/2002 | Kawai ..................... | G06T 5/003 358/1.9 |

(Continued)

FOREIGN PATENT DOCUMENTS

TW I255134 B 5/2006
TW I466064 B 12/2014

*Primary Examiner* — David T Welch
(74) *Attorney, Agent, or Firm* — Birch, Stewart, Kolasch & Birch, LLP

(57) ABSTRACT

An image processing method and an electronic device thereof are provided. The image processing method includes performing a color processing procedure on the target pixel and correspondingly obtaining a plurality of first processed pixels. The color processing procedure includes: determining, according to the color saturation value of the target pixel and a color partitioning parameter, that the target pixel is located in a low color saturation region, a medium color saturation region, or a high color saturation region; performing suppression processing on the target pixel located in the low color saturation region, to suppress the color saturation value of the target pixel into a grayscale value; performing progressive suppression processing on the target pixel located in the medium color saturation region, to suppress the color saturation value of the target pixel according to a suppression ratio; and maintaining the original color saturation value of the target pixel located in the high color saturation region.

20 Claims, 6 Drawing Sheets

(56) References Cited

U.S. PATENT DOCUMENTS

| | | | |
|---|---|---|---|
| 2005/0276470 A1* | 12/2005 | Kim | H04N 9/68 |
| | | | 382/162 |
| 2005/0276471 A1* | 12/2005 | Shin | H04N 9/3182 |
| | | | 382/162 |
| 2006/0055985 A1 | 3/2006 | Ikeda | |
| 2006/0092174 A1 | 5/2006 | Lin | |
| 2007/0269104 A1* | 11/2007 | Whitehead | G06T 5/008 |
| | | | 382/162 |
| 2015/0271365 A1* | 9/2015 | Kishimoto | G06T 5/009 |
| | | | 382/167 |
| 2015/0348506 A1* | 12/2015 | Ooga | G09G 5/02 |
| | | | 345/205 |
| 2016/0255320 A1* | 9/2016 | Shintani | G06T 5/50 |
| | | | 348/239 |
| 2018/0182316 A1* | 6/2018 | Chen | G09G 3/3648 |
| 2019/0174081 A1* | 6/2019 | Maruyama | H04N 9/7908 |

* cited by examiner

IMAGE PROCESSING METHOD AND ELECTRONIC DEVICE THEREOF

CROSS-REFERENCE TO RELATED APPLICATION

This non-provisional application claims priority under 35 U.S.C. § 119(a) to patent application Ser. No. 10/810, 7926 in Taiwan. R.O.C. on Mar. 8, 2019, the entire contents of which are hereby incorporated by reference.

BACKGROUND

Technical Field

This invention relates to a digital image processing technology, and in particular, to an image processing method for suppressing color noise and an electronic device thereof.

Related Art

Image signal processors (ISP) used in image capturing electronic devices are widely applied to various products, such as digital cameras, smartphones, computer cameras, surveillance system, and the like. To reduce color noise in an image, an image signal processor reduces color saturations of some regions in the image. For example, a region having a relatively low color saturation in the image is calculated according to RGB three-primary colors, and a coefficient value of a color component U/V signal of a pixel in the region is reduced. Alternatively, color components: U/V values of a pixel located in a high brightness region are reduced by a proportion. These methods may cause a color saturation not belonging to color noise in the image to decrease as well and thus affect visual feelings of human eyes.

On the other hand, limited by characteristics of photosensitive elements, when blooming appears in an image, chromatic aberration appears around pixels through which high lux light passes. Common chromatic aberration is forming a false color, such as purple fringing, easily perceived by human eyes, around a window or a high lux light source.

SUMMARY

As stated above, the prior art discloses suppression on color components including U/V values, which reduces color noise but reduces saturations of other colors in an image. Consequently, quality of the image is lowered.

In view of this, the invention provides an image processing method, applicable to processing an image, the image having a plurality of target pixels and each target pixel having a color saturation value. The image processing method includes: performing a color processing procedure on the target pixel and correspondingly obtaining a plurality of first processed pixels, the color processing procedure including: determining, according to the color saturation value of the target pixel, that the target pixel is located in a low color saturation region, a medium color saturation region, or a high color saturation region; then performing suppression processing on the target pixel located in the low color saturation region, to suppress the color saturation value of the target pixel into a grayscale value; performing progressive suppression processing on the target pixel located in the medium color saturation region, to suppress the color saturation value of the target pixel according to a suppression ratio; maintaining the color saturation value of the target pixel located in the high color saturation region; and outputting all the first processed pixels.

The invention further provides an electronic device, including an image acquiring unit and an image signal processor. The image acquiring unit acquires a plurality of target pixels of an image and transmits the plurality of target pixels to the image signal processor. After performing a color processing procedure on each target pixel and correspondingly obtaining a plurality of first processed pixels, the image signal processor outputs the first processed pixels. The color processing procedure includes: determining, by the image signal processor according to the color saturation value of the target pixel, that the target pixel is located in a low color saturation region, a medium color saturation region, or a high color saturation region; performing, by the image signal processor, suppression processing on the target pixel located in the low color saturation region, to suppress the color saturation value of the target pixel into a grayscale value; performing progressive suppression processing on the target pixel located in the medium color saturation region, to suppress the color saturation value of the target pixel according to a suppression ratio; or maintaining the color saturation value of the target pixel located in the high color saturation region.

According to some embodiments, the color partitioning parameter includes a UN color plane, a first frame, and a second frame; the first frame and the second frame are located in the UN color plane, and the second frame is located outside the first frame, a coordinate center of the UN color plane is located within the first frame, the low color saturation region is located within the first frame, the medium color saturation region is located between the first frame and the second frame, and the high color saturation region is located outside the second frame.

According to some embodiments, the suppression ratio is in a proportion to a distance between the target pixel and the coordinate center.

According to some embodiments, after the plurality of first processed pixels is output, the invention further includes: determining, according to a blooming determining procedure, whether each first processed pixel is located in a blooming region, and when the first processed pixel is located in the blooming region, performing the color processing procedure for the second time, and correspondingly obtaining a plurality of second processed pixels, to perform color suppression on a partially overexposed blooming pixel.

According to some embodiments, the blooming determining procedure includes determining that the first processed pixel is located in a high brightness region in the image and determining that the first processed pixel is located in an edge region in the image, that is, determining that the first processed pixel is located in the blooming region, which requires performing the color processing procedure for the second time.

In conclusion, according to some embodiments, suppression is performed in the UN color plane within an appropriate range, and progressive adjustment and design are used to avoid color discontinuousness. Therefore, natural color presentation of the image can be effectively maintained.

DETAILED DESCRIPTION

An image processing method provided in the present invention is used in an electronic device having an image processing capability, and an image signal processor is used to perform suppression processing on the image. Each image consists of a plurality of pixels, and at least some or all of the plurality of pixels may be used as target pixels. Therefore, in the present invention, when color noise suppression processing is performed on an image, the color noise suppression processing is performed on target pixels in the image.

Figure 1:
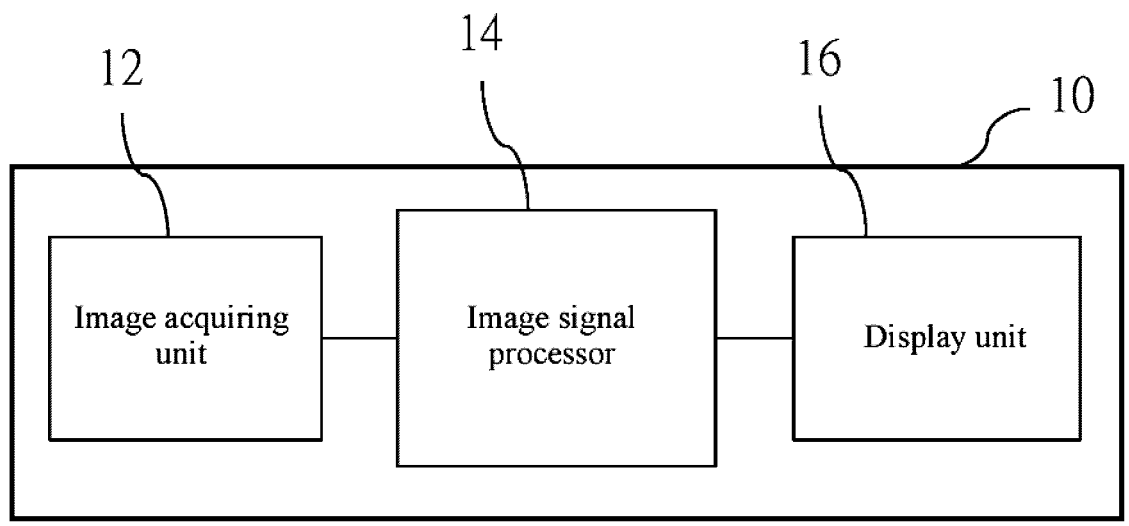
FIG. 1 is a schematic block diagram of an electronic device according to an embodiment of the present invention.

FIG. 1 is a schematic block diagram of an electronic device according to an embodiment of the present invention. Referring to FIG. 1, an electronic device 10 includes an image acquiring unit 12, an image signal processor 14, and a display unit 16. The image acquiring unit 12 captures at least one image and an environment parameter such as scene brightness of the image. In some embodiments, the image acquiring unit 12 is an image sensing element such as a charge coupled device (CCD) or a complementary metal-oxide-semiconductor (CMOS). The image signal processor 14 is electrically connected to the image acquiring unit 12 and the display unit 16. The image acquiring unit 12 transmits a plurality of target pixels of the acquired image to the image signal processor 14. The image signal processor 14 receives the image and performs image processing on all the target pixels in the image to obtain processed target pixels. The processed target pixels are transmitted to the display unit 16, and the display unit 16 displays the processed image.

Figure 2:
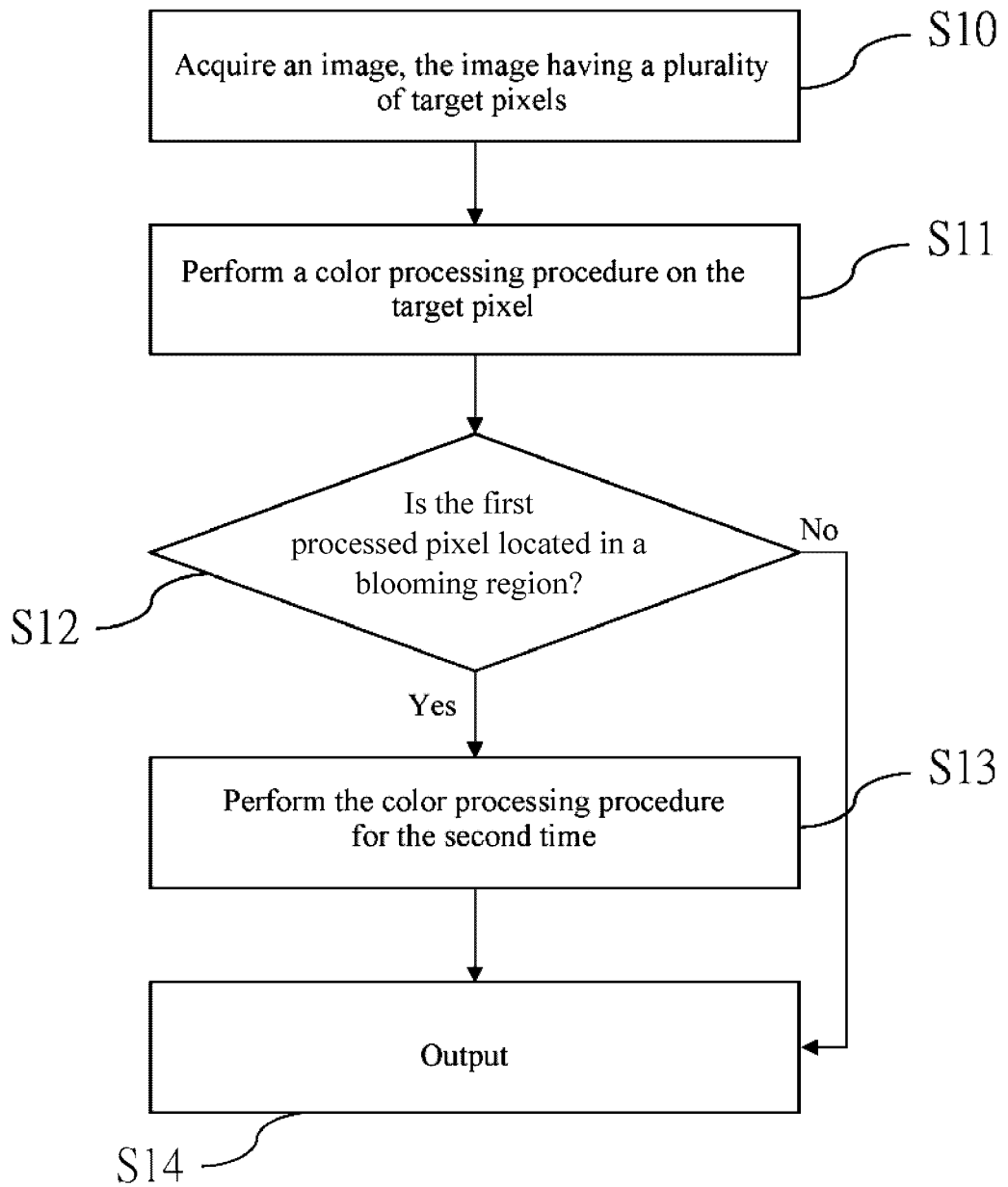
FIG. 2 is a flowchart of an image processing method according to an embodiment of the present invention.

FIG. 2 is a flowchart of an image processing method according to an embodiment of the present invention. Referring to FIG. 1 and FIG. 2, in step S10, an image acquiring unit 12 performs image capturing on a scene to acquire an image. The image has a plurality of target pixels, and each target pixel has a color saturation value. In an embodiment, the color saturation value includes color components including a U value and a V value.

In step S11, an image signal processor 14 performs a color processing procedure on the target pixel to perform global color suppression, so that a plurality of first processed pixels is obtained and outputted correspondingly. Therefore, the color processing procedure can be applied to suppress color noise in the image.

Subsequently, in step S12, the image signal processor 14 determines, according to a blooming determining procedure, whether each first processed pixel is located in a blooming region. If the first processed pixel is located in the blooming region, a second time of the color processing procedure is applied on the first processed pixel, as shown in step S13, to perform high brightness color suppression, so that a plurality of second processed pixels is obtained correspondingly. If the first processed pixel is not located in the blooming region, step S14 is performed accordingly.

In step S14, the image signal processor 14 outputs the second processed pixels or the first processed pixels to the display unit 16 for display. The second processed pixels obtained after the color processing procedure is performed twice and the first processed pixels only need to undergo the color processing procedure once.

In some embodiments, the global color suppression in step S11 and the high brightness color suppression in step S13 both use the same color processing procedure.

Figure 3:
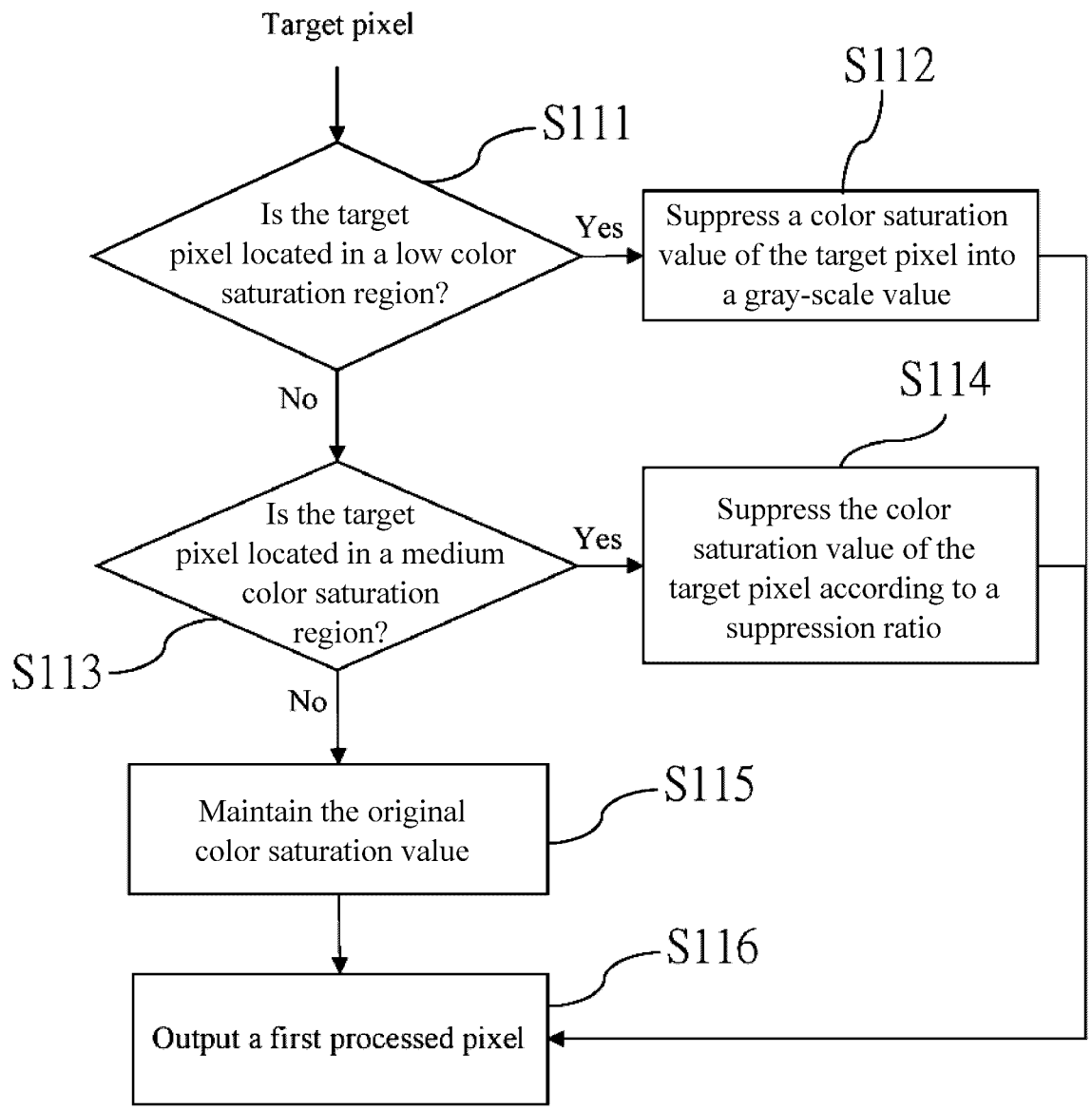
FIG. 3 is a flowchart of a color processing procedure according to an embodiment of the present invention.

FIG. 3 is a flowchart of a color processing procedure according to an embodiment of the present invention. Referring to FIG. 1 to FIG. 3, in the color processing procedure of step S11, the image signal processor 14 determines, according to the color saturation value of each target pixel and a color partitioning parameter, that the target pixel is located in a low color saturation region, a medium color saturation region, or a high color saturation region. Details of the color processing procedure are shown in FIG. 3.

Figure 4:
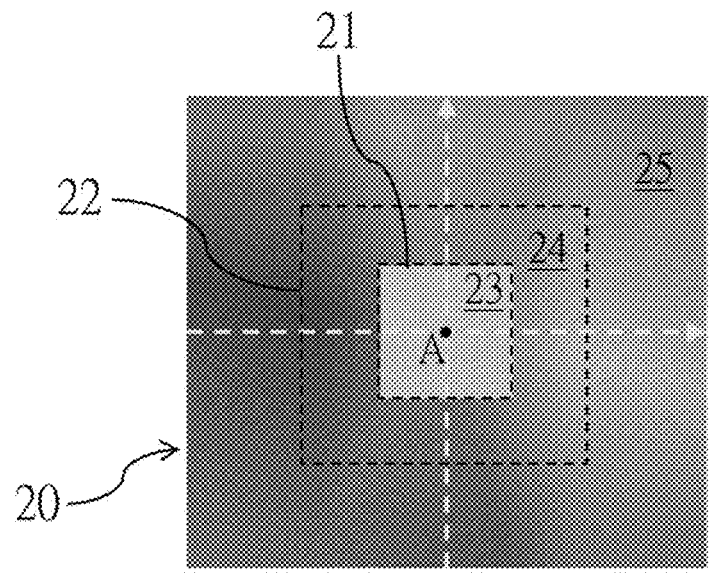
FIG. 4 is a schematic color diagram of a color partitioning parameter according to an embodiment of the present invention.

In some embodiments, the color partitioning parameter is shown in FIG. 4. For the global color suppression, a color of each target pixel in the image is suppressed in a UN color plane. The color distribution of the UN color plane includes a magenta color in the first quadrant, an orange color in the second quadrant, a green color in the third quadrant, and a blue color in the fourth quadrant. A pixel closer to a coordinate center A has a lower color saturation and represents a gray scale color. A pixel away from the coordinate center A has a higher color saturation and respectively represents different colors according to different quadrants. Therefore, the color partitioning parameter used in this invention includes a UN color plane 20, a first frame 21, and a second frame 22. The first frame 21 and the second frame 22 are located on the UN color plane 20, and the second frame 22 is located outside the first frame 21, so that the coordinate center A of the UN color plane 20 is located within the first frame 21. The color saturation is divided into three ranges according to the positions of the first frame 21 and the second frame 22. A low color saturation region 23 is located within the first frame 21 and covers the coordinate center A of the U/V color plane 20. The low color saturation region 23 represents a suppression range (a gray region). A region between the first frame 21 and the second frame 22 is a medium color saturation region 24. The medium color saturation region 24 represents a progressive suppression range. A range outside the second frame 22 is a high color saturation region 25.

Referring to all FIG. 1 to FIG. 4, in the color processing procedure of step S11, when the image signal processor 14 determines the location of each target pixel according to the color saturation value of the target pixel and a color partitioning parameter, step S11 is performed. In step S111, the image signal processor 14 determines, according to the color saturation value of the known target pixel and the color partitioning parameter, whether the target pixel is located in the low color saturation region 23 of the UN color plane 20. If the target pixel is located in the low color saturation region 23, step S112 is performed. In step S112, the image signal processor 14 performs suppression processing on the target pixel to suppress the color saturation value of the target pixel into a grayscale value. In an embodiment, suppressing the color saturation value into the gray-scale value means suppressing U/V values of color components into (128, 128). If the target pixel is not located in the low color saturation region 23, step S113 is performed. As shown in step S113, the image signal processor 14 determines whether the target pixel is located in the medium color saturation region 24. If the target pixel is located in the medium color saturation region 24 of the U/V color plane 20, step S114 is performed. As shown in step S114, the image signal processor 14 performs progressive suppression processing on the target pixel to suppress the color saturation value of the target pixel according to a suppression ratio. If the target pixel is not located in the medium color saturation region 24, it indicates that the target pixel is located in the high color saturation region 25 of the U/V color plane 20. The target pixel located in the high color saturation region 25 is not affected, as shown in step S115, the original color saturation value of the target pixel is maintained. The target pixel that is completed in step S112, step S114, or step S115 is represented as a first processed pixel that has completed processing. Next, in step S116, the image signal processor 14 outputs the first processed pixel.

Figure 5:
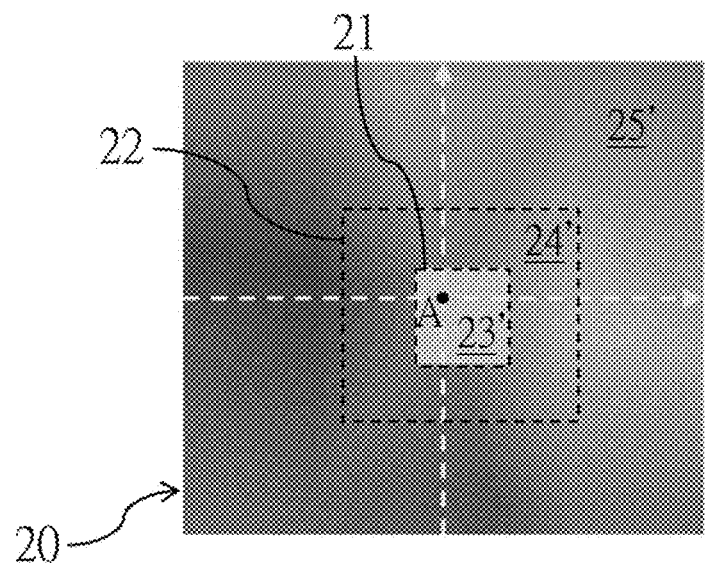
FIG. 5 is a schematic color diagram of a color partitioning parameter according to another embodiment of the present invention.

In some embodiments, the first frame 21 and the low color saturation region 23 (a suppression range) within the first frame 21 of the color partitioning parameter is a movable gray rectangular region and needs to cover the location of the coordinate center A. In this case, a rectangle is used as an example, but this application is not limited thereto. In application of different scenes or according to preferences of a user, size of the rectangular region may be flexibly adjusted, and the rectangular region may be moved to cover a color to be suppressed. Referring to FIG. 4 and FIG. 5, in an embodiment, if a human appears in the image, locations of the first frame 21 and the second frame 22 may be adjusted to keep the complexion of a human face, so that the low color saturation region 23 has a small coverage in a second quadrant (that is, a quadrant in which the complexion is located), as shown in a low color saturation region 23' in FIG. 5. Certainly, coverage of a medium color saturation region 24' and a high color saturation region 25' is also adjusted accordingly, and a new color partitioning parameter is used in the color processing procedure to protect the complexion of a human face and suppress color noise.

In some embodiments, in the color partitioning parameter, the medium color saturation region 24 located between the first frame 21 and the second frame 22 is designed into a progressive suppression range for the purpose of avoiding color discontinuousness of the image after suppression. As shown in FIG. 1 and FIG. 4, in the medium color saturation region 24, because the suppression ratio is in a proportion to a distance between the target pixel and the coordinate center A, in step S114, the image signal processor 14 adjusts the suppression ratio according to the distance between the target pixel and the coordinate center A and performs progressive suppression processing by using the following equation:

$$C_{out}=((C_{in}-128)*supp\_rate+128$$

where $C_{in}$ is a color saturation value of the target pixel when the target pixel is input, $C_{out}$ is a color saturation value of the target pixel after suppression when the target pixel is output, and supp_rate is the suppression ratio. Calculation of the suppression ratio may be performed by means of interpolation or filter but is not limited thereto.

In an embodiment, ranges of the low color saturation region (a suppression range) 23 located within the first frame 21 and the medium color saturation region (a progressive suppression range) 24 located between the first frame 21 and the second frame 22 are determined by scene brightness provided when the image acquiring unit 12 acquires the image. The scene brightness may come from, but not limited to, automatic exposure controlled by firmware. That is, the sizes of the first frame 21 and the second frame 22 are inversely proportional to scene brightness provided when the image is acquired. Higher scene brightness indicates smaller sizes of the first frame 21 and the second frame 22, indicates smaller sizes of the low color saturation region 23 and the medium color saturation region 24, and indicates relatively little or no suppression on color noise. Lower scene brightness indicates larger sizes of the first frame 21 and the second frame 22, indicates larger sizes of the low color saturation region 23 and the medium color saturation region 24, and indicates relatively much suppression on color noise.

Figure 6:
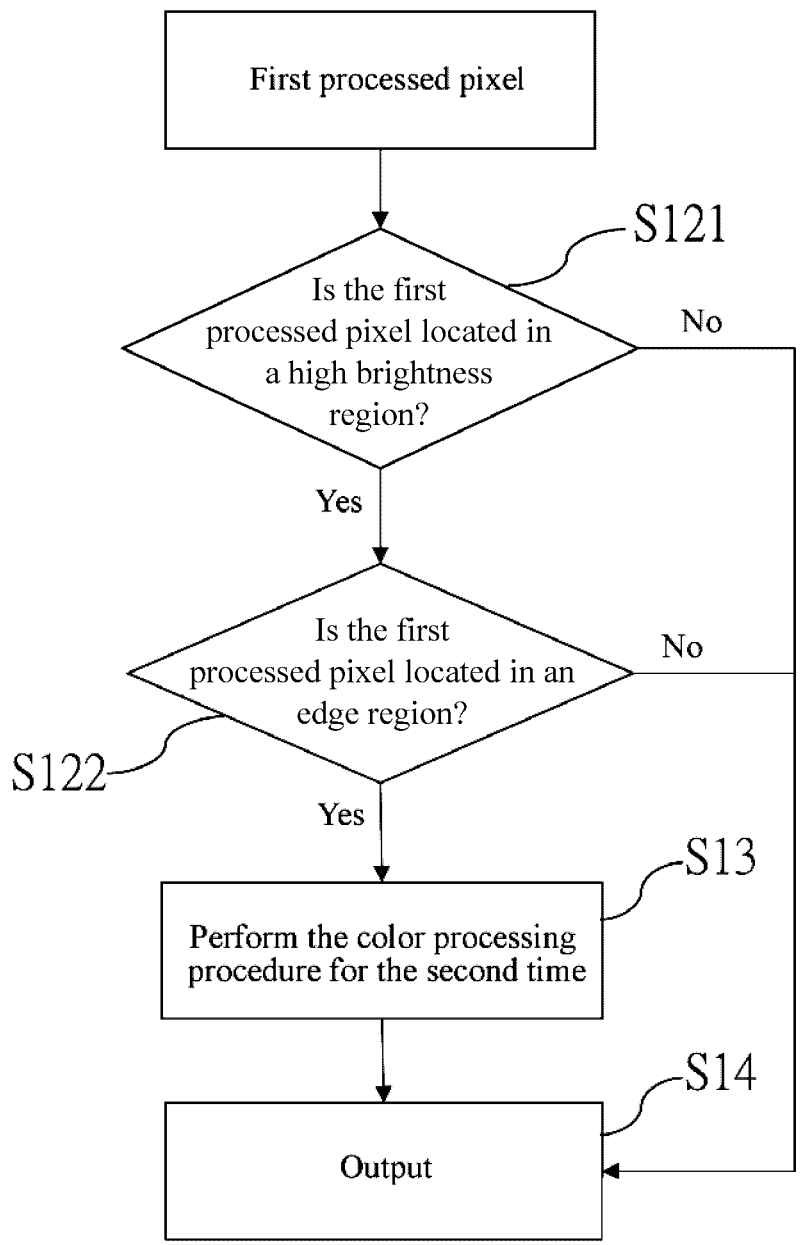
FIG. 6 is a flowchart of high brightness color suppression according to an embodiment of the present invention.

After the color processing procedures (as in steps S111 to S115) on all the target pixels are completed as in step S11 of FIG. 2, to remove chromatic aberration that appears on edges of a high brightness object, step S12 is performed again to determine whether each first processed pixel is located in a blooming region. Referring to all FIG. 1, FIG. 2, and FIG. 6, in the step of determining, according to a blooming determining procedure, whether each first processed pixel is located in a blooming region, the blooming determining procedure is shown in step S121 and step S122. The image signal processor 14 first determines whether the first processed pixel is located in a high brightness region of the image. If the first processed pixel is located in the high brightness region of the image, the image signal processor 14 continues to determine whether the first processed pixel is located in an edge region in the image. When conditions of the two steps are both established, it can be determined that the first processed pixel is located in the blooming region, and high brightness color suppression needs to be performed. As shown in step S13, performing the color processing procedure for the second time on the first processed pixel located in the blooming region, to perform color suppression on a partially overexposed blooming pixel. The color processing procedure is shown in steps S11 to S115 in FIG. 3. The first processed pixel is used as a target pixel to repeatedly perform steps S11 to S115, and detailed content thereof is described above and is not described herein again. In an embodiment, the image signal processor 14 uses absolute brightness values of the target pixel and pixels adjacent to the target pixel as a threshold for a high brightness condition and calculates a gradient value of the target pixel to detect whether the target pixel is located in the edge region.

Figure 7:
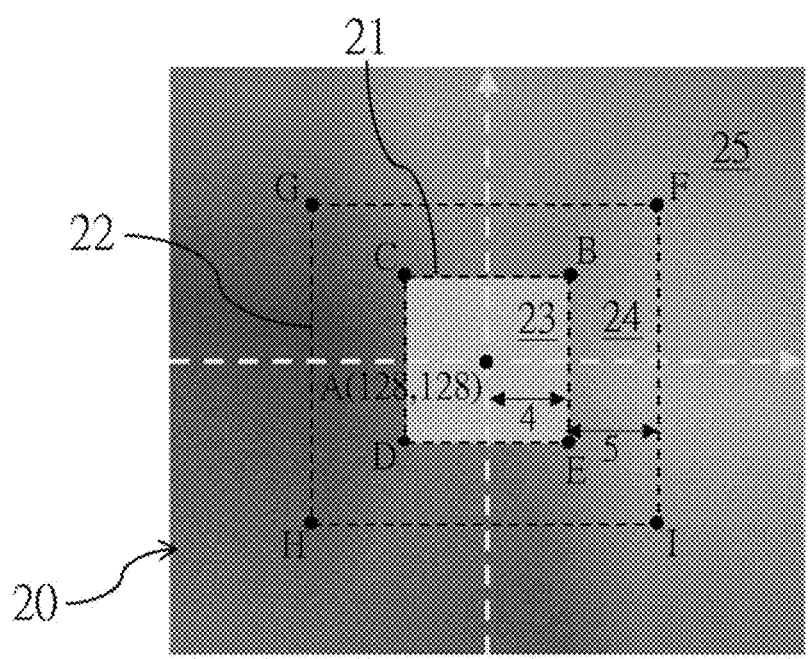
FIG. 7 is a schematic color diagram of a color partitioning parameter according to a specific example of the present invention.

Referring to the embodiment shown in FIG. 7, when the color processing procedure is actually performed, in the color partitioning parameter shown in FIG. 7, the location of the coordinate center A is (128,128) in the U/V color plane 20. Assuming that a suppression range within the low color saturation region 23 is set to 4, and a progressive suppression range within the medium color saturation region 24 is set to 5, coordinates of four endpoints B(132,132), C(124, 132), D(124,124), and E(132,124) define the location and the size of the first frame 21, and coordinates of four endpoints F(137,137), G(119,137), H(119,119), and 1(137, 119) define the location and the size of the second frame 22. Therefore, a target pixel whose color components, the U value and the V value, are within (128−4) to (128+4) is suppressed into a gray-scale value 128. Original color components of a target pixel whose U value and V value are beyond (128-9) to (128+9) are maintained. A suppression ratio of a target pixel within a middle range between the first frame 21 and the second frame 22 is calculated according to a proportion, and then new color components, the U value and the V value, are calculated by the foregoing equation. For example, a color saturation value of a target pixel is (U, V)=(131, 128), it means that the target pixel is located within the low color saturation region 23. In this case, the target pixel is suppressed into (128, 128) and becomes a grayscale pixel. A color saturation value of a target pixel is (U, V)=(134, 128), it means that the target pixel is located within the medium color saturation region 24. Therefore, the suppression ratio is first calculated supp_rate=|134−128|/(4+5)=0.667 and then is used in the equation for calculation ($C_{out}$=(134−128)*0.667+128□132. Therefore, the color saturation value of the target pixel is progressively suppressed from original (134, 128) into (132, 128), which is lower than the original color saturation value. The color saturation value of the target pixel is (U, V)=(140, 128), it means that the target pixel is located within the high color saturation region 25 (located outside the second frame 22). Therefore, the color saturation value of the target pixel is maintained as the same (140, 128) for output, and the color keeps unchanged. In this case, the suppression range is set to 4, and the progressive suppression range is set to 5. However, this is merely an example, and the invention is not limited thereto. The suppression range and the progressive suppression range in the invention may be adjusted as any value according to situations.

Therefore, in the invention, suppression is performed in the U/V color plane within an appropriate range, and adjustment and design of the progressive suppression range are used to avoid color discontinuousness, to maintain natural color presentation of the image. In a low lux environment, color noise can be reduced, and a saturation of the complexion of a human face keeps unchanged. When blooming appears in the image, the color saturation of the false color may be reduced through color suppression in this invention. Therefore, in the invention, color noise in the image can be effectively suppressed, and image quality can be maintained.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An image processing method, applicable to processing an image, the image having a plurality of target pixels, each target pixel having a color saturation value, and the image processing method comprising:
    performing a color processing procedure on each target pixel and correspondingly obtaining a plurality of first processed pixels, the color processing procedure comprising:
        determining, according to the color saturation value of each target pixel and a color partitioning parameter, that each target pixel is located in a low color saturation region, a medium color saturation region, or a high color saturation region;
        performing suppression processing on a target pixel located in the low color saturation region to suppress the color saturation value of the target pixel located in the low color saturation region into a grayscale value;
        performing progressive suppression processing on a target pixel located in the medium color saturation region to suppress the color saturation value of the target pixel located in the medium color saturation region according to a suppression ratio; and
        maintaining the color saturation value of a target pixel located in the high color saturation region; and
    outputting the plurality of first processed pixels.

2. The image processing method according to claim 1, wherein the color partitioning parameter comprises a U/V color plane, a first frame, and a second frame; the first frame and the second frame are located in the U/V color plane, and the second frame is located outside the first frame, a coordinate center of the U/V color plane is located within the first frame, the low color saturation region is located within the first frame, the medium color saturation region is located between the first frame and the second frame, and the high color saturation region is located outside the second frame.

3. The image processing method according to claim 2, wherein the suppression ratio is in a proportion to a distance between the target pixel located in the medium color saturation region and a coordinate center.

4. The image processing method according to claim 3, wherein the progressive suppression processing is performed on the target pixel located in the medium color saturation region by using the following equation:

$$C_{out}=(C_{in}-128)*\text{supp\_rate}+128$$

wherein $C_{in}$ is a color saturation value of the target pixel located in the medium color saturation region when the target pixel located in the medium color saturation region is input, $C_{out}$ is a color saturation value of the target pixel located in the medium color saturation region after suppression when the target pixel located in the medium color saturation region is output, and supp_rate is the suppression ratio.

5. The image processing method according to claim 1, after the step of outputting the plurality of first processed pixels, further comprising:
    determining, according to a blooming determining procedure, whether each first processed pixel is located in a blooming region, and when a first processed pixel is located in the blooming region, performing the color processing procedure for the second time, and correspondingly obtaining a plurality of second processed pixels.

6. The image processing method according to claim 5, wherein the blooming determining procedure comprises determining that the first processed pixel is located in a high brightness region in the image and determining that the first processed pixel is located in an edge region in the image, thereby determining that the first processed pixel is located in the blooming region.

7. The image processing method according to claim 6, wherein the high brightness region is determined according to brightness of the first processed pixel and first processed pixels adjacent to the first processed pixel.

8. The image processing method according to claim 6, wherein whether the first processed pixel is located in the edge region is determined by a gradient value.

9. The image processing method according to claim 3, wherein sizes of the first frame and the second frame are inversely proportional to scene brightness provided when the image is acquired, and higher scene brightness indicates smaller sizes of the first frame and the second frame.

10. The image processing method according to claim 9, wherein the scene brightness is acquired through automatic exposure when the image is acquired.

11. An electronic device, comprising:
an image acquiring unit, acquiring an image, the image having a plurality of target pixels and each target pixel having a color saturation value; and
an image signal processor electrically connected to the image acquiring unit performing a color processing procedure on each target pixel, and correspondingly obtaining a plurality of first processed pixels, the color processing procedure comprising: determining, by the image signal processor according to the color saturation value of each target pixel and a color partitioning parameter, that each target pixel is located in a low color saturation region, a medium color saturation region, or a high color saturation region; performing, by the image signal processor, suppression processing on a target pixel located in the low color saturation region, to suppress the color saturation value of the target pixel located in the low color saturation region into a grayscale value; performing progressive suppression processing on a target pixel located in the medium color saturation region to suppress the color saturation value of the target pixel located in the medium color saturation region according to a suppression ratio; and maintaining the color saturation value of a target pixel located in the high color saturation region.

12. The electronic device according to claim 11, wherein the color partitioning parameter comprises a UN color plane, a first frame, and a second frame; the first frame and the second frame are located in the UN color plane, and the second frame is located outside the first frame, a coordinate center of the UN color plane is located within the first frame, the low color saturation region is located within the first frame, the medium color saturation region is located between the first frame and the second frame, and the high color saturation region is located outside the second frame.

13. The electronic device according to claim 12, wherein the suppression ratio is in a proportion to a distance between the target pixel located in the medium color saturation region and a coordinate center.

14. The electronic device according to claim 13, wherein the progressive suppression processing is performed on the target pixel located in the medium color saturation region by using the following equation:

$$C_{out} = (C_{in} - 128) * \text{supp\_rate} + 128$$

wherein $C_{in}$ is a color saturation value of the target pixel located in the medium color saturation region when the target pixel located in the medium color saturation region is input, $C_{out}$ is a color saturation value of the target pixel located in the medium color saturation region after suppression when the target pixel located in the medium color saturation region is output, and supp_rate is the suppression ratio.

15. The electronic device according to claim 11, wherein the image signal processor further determines, according to a blooming determining procedure, whether each first processed pixel is located in a blooming region, and when a first processed pixel is located in the blooming region, performs the color processing procedure for the second time, and correspondingly obtains a plurality of second processed pixels.

16. The electronic device according to claim 15, wherein the blooming determining procedure comprises determining, by the image signal processor, that the first processed pixel is located in a high brightness region in the image and determining that the first processed pixel is located in an edge region in the image, thereby determining that the first processed pixel is located in the blooming region.

17. The electronic device according to claim 16, wherein the image signal processor determines the high brightness region according to brightness of the first processed pixel and processed pixels adjacent to the first processed pixel.

18. The electronic device according to claim 16, wherein the image signal processor determines, by a gradient value, whether the first processed pixel is located in the edge region.

19. The electronic device according to claim 13, wherein sizes of the first frame and the second frame are inversely proportional to scene brightness provided when the image is acquired, and higher scene brightness indicates smaller sizes of the first frame and the second frame.

20. The electronic device according to claim 19, wherein the image acquiring unit acquires the scene brightness through automatic exposure when the image is acquired.

* * * * *